Sept. 15, 1959  J. A. STEIN  2,904,071
VALVE
Filed Jan. 7, 1955
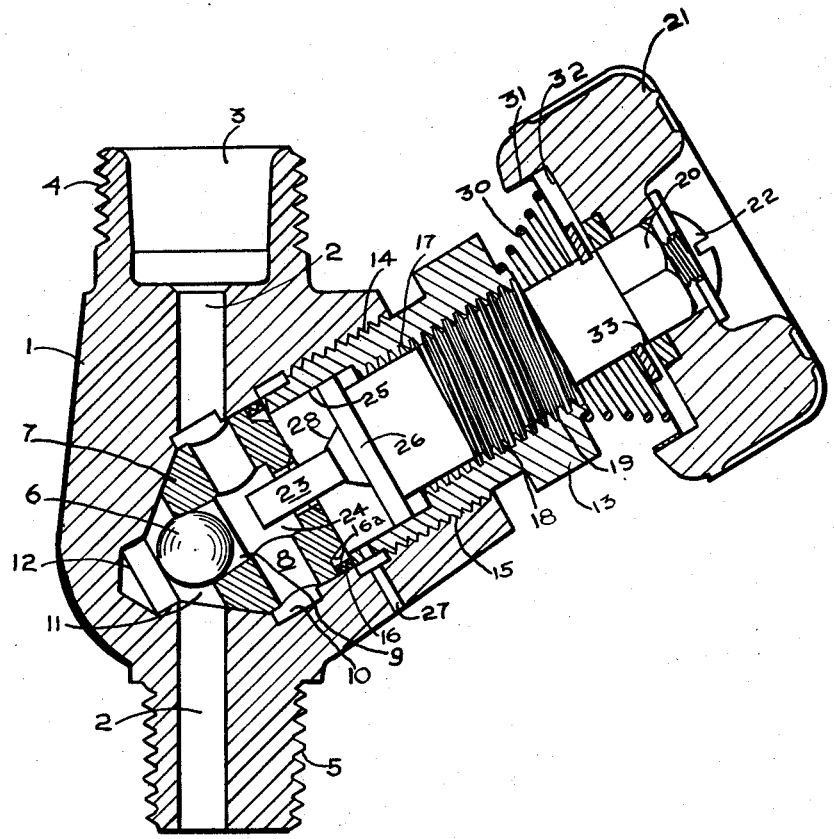
INVENTOR
JOSEPH A. STEIN
BY J.E. Dickinson
HIS ATTORNEY.

2,904,071
VALVE

Joseph A. Stein, Pittsburgh, Pa., assignor to Bacharach Industrial Instrument Company, Pittsburgh, Pa., a corporation of Pennsylvania Application January 7, 1955, Serial No. 480,499

2 Claims. (Cl. 137—596)

This invention relates generally to a high pressure valve and more particularly, although not necessarily so restricted, to what is commonly known in the internal combustion engine industry as an engine indicator valve.

While valves of this character may be used for various purposes, this improvement is particularly adapted for installation in the head of an internal combustion engine to receive a pressure measuring indicator or other instrument for obtaining engine information.

The nature and a complete appreciation of the improvements comprising this invention will be readily apparent from the following description when read in conjunction with the accompanying drawing in which a single embodiment of the invention is illustrated, by a sectional view taken vertically through the mid-part of the valve assembly.

Referring in detail to this drawing, the housing or body part of the valve assembly is designated by the reference numeral 1. Extending longitudinally through the center of this body part 1, there is provided a bore 2, the upper end of which terminates in an enlarged bore 3 shaped for receiving the standard conical end of a pressure-measuring indicator or other instrument or device not shown. On the periphery of the body part 1 opposite the cone-receiving bore 3 a thread 4 is provided for facilitating the connection of the valve body to the pressure indicator, or other device not shown.

On the periphery of the body part 1 opposite the lower end of the axially disposed bore 2, threads 5 are provided for attaching the valve body to the cylinder head of an engine or to a fitting secured to an engine cylinder. Intermediate the two ends of this centrally disposed bore 2, the valving mechanism of the assembly is located in an angularly disposed bore 10 which terminates at its inner end in a tapered recess 11. In the present embodiment a ball 6 is utilized as a valve element. The seat for this ball is provided by an annular seating element 7 which has in it a transverse bore 8 that communicates with the upper part of the axially disposed bore 2 in the body part 1 and an axially disposed bore 9 which by way of the recess 11 communicates when the seat element 7 is in its operative position with the lower part of the axially disposed bore 2 in the body 1.

This recess 11 for the seating element 7 is formed in the body part 1 with an outwardly tapering wall to receive a similarly shaped surface on the adjacent lower end of the seat element 7, and with a base offset 12 of substantially uniform size which is of slightly greater diameter than the diameter of the ball valve 6 into which the ball 6 may fall or be forced to open the valve and from which the ball may be moved against its seat due to the action thereon of a fluid or an engine gas passing through the bore 2 from the bottom upwards.

The axial bore 9 in the seat element 7 is tapered inwardly from its lower end upward and so dimensioned that the ball 6 may be wedged into it as the ball is urged upwardly into this bore by the action of the fluid being controlled, such as when applied to an engine gas.

As shown, the bore 10 into which the seat element 7 fits extends outwardly through an enlarged offsetting part of the body part 1 and has a center axis which is inclined upwardly at an angle to the center line of the bore 2, thus facilitating the valving of the main center bore 2 and the assembly of the valve 6 and seat element 7.

To removably and firmly hold the seat element 7 in place, a tubular fitting 13 is provided. The outer end of the bore 10 is threaded at 14 to engage peripheral threads 15 on this fitting and the fitting is so designed that when it is screwed into position, its inner end engages the outer face of the seating element 7 and forces the lower tapered surface of the seating element tightly against the tapered wall at the inner end of the recess 11. To provide a pressure-tight seal between the inner end of the fitting 13, the top of the seat element 7, and the wall of bore 10, a gasket 16 is provided in a recess 16a about the outer edge of the outer face of the seating element 7 against which the inner end of the fitting 13 is engaged. The inner end of the fitting 13 is tapered to bias the gasket 16 outward as it is compressed to effect the pressure-tight seal simultaneously against the wall of the bore 10 and the recess 16a in the top of seat element 7.

Interiorly of the fitting 13 and at the outer end thereof a thread 17 is provided into which a valve opening plunger 18 is fitted by means of threads 19 formed on its outer surface for such purpose. For turning this plunger 18 into and out of the fitting 13 it is provided with an outer end extension 20 onto which there is releasably mounted a handle or turning knob 21 preferably made of some suitable heat-insulating material. To permit removal of this knob it is held in place by a screw 22.

In service due to the temperatures encountered, assemblies such as this frequently get so tight that turning of the plunger is difficult and with this problem in mind the extension 20 of the plunger is made non-circular so that the knob 21 may be removed and a turning tool applied to the extension 20 to turn the plunger.

At the inner end of the plunger 18 it is provided with a reduced extension 23 which is adapted to be moved into the axial bore 9 in the seat element 7 to engage and unseat the valve 6 when the plunger is turned to its innermost position, to thereby positively unseat the ball valve. To maintain adequate passageway for the fluid through the valve assembly when the plunger extension 23 is moved into the axial bore 9 of the valve seat 7, the latter passage is enlarged at 24 where it intersects the transverse bore 8.

Valve assemblies of this kind are subjected to considerable vibration in service and if not prevented from doing so, the plunger 18 will sometimes work from its inactive to its valve-opening position and engage and wear a flat spot on the valve. To prevent this a tapered helical compression spring 30 is employed. One end of this spring, to accomplish such purpose, is seated on the outer end of the fitting 13 and the other end on an open-centered inverted cup-shaped retainer 31 which is mounted in a recess 32 in the underside of the knob 21. This retainer 31 is rested at its center against a ring 33 that is mounted on the plunger 18. Thus the force of the spring 30 on the ring 33 overcomes any tendency of the spring 30 on the ring 33 overcomes any tendency of the plunger 18 due to vibration moving to its valve-opening position. To prevent the plunger 18 from moving beyond a desired retracted position a collar 26 is provided on the plunger to engage the outer end of the enlarged inner bore 25 in the fitting 13. Below the collar 26 a tapered boss 28 is provided on the plunger to form a valve element which will positively seal the outer end of the bore 9 when the plunger is moved to its innermost position.

Preferably the threads 17 and 19 on the plunger 18 are provided with a very steep pitch so that the operator will not have to hold it for lengthy periods of turning to adjust it for its different operative positions. This is done to both expedite the operation of the plunger and prevent the operator getting his hands burned in case the assembly is highly heated.

Another feature of this improved assembly is the provision of a vent 27 for connecting the bore 2 to the atmosphere when the valve 6 is closed. As shown, this vent is located near the bottom of the plunger 18 and at such a distance from the plunger handle 21 that the hot gases which escape when the valve 28 is opened and closed will not contact the operator's hand.

In operation when the valve 6 is unseated, it either drops into the recess 12 or is forced there by the plunger extension 23, and the pressures from the engine pass freely through the bore 2. When the plunger 18 is retracted, the gas pressures from the engine cause the valve 6 to be lifted and forced into engagement with its seat in the bore 9 and with each added impulse due to the taper of the bore 9, the valve becomes more and more firmly seated in its closed position and to such an extent that even the suction forces which develop on the engine between cycles will not unseat the valve.

Indicator valves of this kind are used for many purposes, such as relieving pressures in an engine cylinder to permit a diesel engine operator to observe the nature of the flame blast when the engine is operating and to measure pressures in an engine cylinder during all periods of operation.

A particular advantage of this improvement is its simplicity of construction and ease with which it can be manufactured and assembled and disassembled, lending itself to easy maintenance without replacement of other than such parts as become outworn or defective. Particularly it permits replacement of all the other parts of the valve assembly without requiring removal of the body part 1 from the engine cylinder, often difficult or even impossible due to thread galling of threads 5 because of high temperature engagement.

It will, of course, be understood that various changes may be made in the foregoing details of arrangements and properties of the parts without departing from the scope of the applicant's invention as described and defined in the appended claims.

I claim:

1. A valve assembly comprising an elongated housing having one bore with the axis thereof extending longitudinally through the housing to permit the passage therethrough of a fluid, and a second bore therein disposed at an angle to the first bore and located to intersect said first bore with its inner end terminating inside said housing on one side of said longitudinally disposed bore and its outer end extending through the housing wall on the opposite side of said longitudinally disposed bore, a valve seating element removably arranged in said second bore with a transverse bore through it registering at one end with one end of said longitudinally disposed housing bore and an axially disposed bore extending therethrough which communicates at one end with the other end of said longitudinally disposed housing bore, a ball valve located in the inner end of said angularly disposed housing bore and arranged for movement into and out of seating engagement with the axially disposed bore in said seating element and so disposed as normally to be forced into seating engagement by pressure acting thereon incident to the fluid tending to pass through the horizontally extending bore, a plunger threadably fitted in the outer end of said angularly disposed housing bore and provided with an end projection dimensional to move into the axially disposed bore in said seating element to engage with and unseat the ball valve when desired, a tubular fitting threadably mounted in said angularly disposed housing bore in which said plunger is threadably engaged and which fitting at its inner end has an enlarged inner bore, an annular rib on the inner end of said plunger which is adapted to engage against the end wall of said enlarged inner bore when the plunger is screwed outwardly to limit the plunger's outward movement and means operative between the plunger and said fitting for resisting movement of said plunger, a tapered boss provided on the inner end of the plunger to seat on and close the outer end of the axially disposed bore in the seating element when the plunger is moved into engagement with said bore and an exhaust port in the valve housing adapted to be exposed by movement of the plunger connecting the angularly disposed bore in the housing with the atmosphere at a point spaced from the outer end of the ball valve unseating plunger and between the valve seating element and the open end of the angularly disposed bore in the valve housing, said port being so arranged that said exhaust port is uninterrupted when said plunger is in its inoperative position.

2. A valve assembly according to claim 1 in which a clearance is provided between said plunger and the outer end of the axially disposed bore of said seating element when said plunger is in its inoperative position.

References Cited in the file of this patent

UNITED STATES PATENTS

| | | |
|---|---|---|
| 639,403 | Klopp | Dec. 19, 1899 |
| 1,374,571 | Hummel | Apr. 12, 1921 |
| 1,945,760 | Strouf | Feb. 6, 1934 |
| 2,039,638 | Druge | May 5, 1936 |
| 2,493,248 | Hughes | Jan. 3, 1950 |
| 2,590,702 | Holmes | Mar. 25, 1952 |
| 2,664,266 | Johnson | Dec. 29, 1953 |
| 2,689,115 | Olson | Sept. 14, 1954 |

FOREIGN PATENTS

| | | |
|---|---|---|
| 285,853 | Great Britain | of 1928 |
| 557,925 | Great Britain | of 1943 |
| 618,611 | Great Britain | Feb. 24, 1949 |